United States Patent
Hakui et al.

(10) Patent No.: US 7,766,345 B2
(45) Date of Patent: Aug. 3, 2010

(54) TELESCOPIC ACTUATOR

(75) Inventors: Takehiko Hakui, Wako (JP); Kotaro Yamaguchi, Wako (JP); Masanori Watanabe, Wako (JP); Atsushi Yuta, Wako (JP); Hajime Kajiwara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 209 days.

(21) Appl. No.: 11/964,420

(22) Filed: Dec. 26, 2007

(65) Prior Publication Data

US 2008/0157490 A1 Jul. 3, 2008

(30) Foreign Application Priority Data

Dec. 27, 2006 (JP) ............................. 2006-352934

(51) Int. Cl.
*B60G 3/26* (2006.01)
(52) U.S. Cl. .............................. 280/5.521; 280/86.757; 74/89.34
(58) Field of Classification Search ................ 280/5.52, 280/5.521, 86.758, 5.522, 86.751, 86.757; 74/89.34, 89.35, 89.37, 89.4, 89.41, 89.23; 188/129, 134
See application file for complete search history.

(56) References Cited

U.S. PATENT DOCUMENTS

| | | | | | |
|---|---|---|---|---|---|
| 3,113,787 | A | * | 12/1963 | Lauderdale | ............ 280/86.758 |
| 4,729,578 | A | * | 3/1988 | Kondo et al. | .......... 280/124.144 |
| 4,881,749 | A | * | 11/1989 | Bausch | .................... 280/5.522 |
| 4,973,070 | A | * | 11/1990 | Menichini et al. | ........ 280/5.521 |

FOREIGN PATENT DOCUMENTS

| | | |
|---|---|---|
| JP | 62-125952 | 6/1987 |
| JP | 2002-176746 | 6/2002 |
| JP | 2003-194174 | 7/2003 |
| JP | 2006-224896 | 8/2006 |

* cited by examiner

*Primary Examiner*—Faye M. Fleming
*Assistant Examiner*—Keith Frisby
(74) *Attorney, Agent, or Firm*—Rankin, Hill & Clark LLP

(57) ABSTRACT

A telescopic actuator includes a housing, an output rod which is slidable in an axial direction with respect to the housing, at least two slide bearings via which the output rod is supported by the housing, and a stopper disposed between the two slide bearings. The stopper regulates a moving end position of the output rod.

12 Claims, 7 Drawing Sheets

TELESCOPIC ACTUATOR

CROSS-REFERENCE TO RELATED APPLICATION(S)

The present application claims priority from Japanese Patent Application No. 2006-352934 filed on Dec. 27, 2006, the entire content of which is incorporated herein by reference.

TECHNICAL FIELD

The present invention relates to a telescopic actuator in which an output rod is supported by a housing so as to be slidable in an axial direction thereof, and the output rod is protruded and retracted by a feed screw mechanism having a male screw member screwed into a female screw member.

BACKGROUND ART

In a suspension apparatus of a vehicle, for example, an upper link and a lower link are controlled to protrude or to retract by an actuator, thereby restraining variations in camber angle and tread of a wheel caused by bumping and rebounding in order to enhance steering stability performance (see, e.g., JP 6-047388 B2). The actuator includes a motor and a feed screw mechanism in which a male screw member is relatively rotated with respect to a female screw member by the motor.

In this type of actuator having a feed screw mechanism, in a case where some kind of abnormality occurs in relation to a control of the motor, the male screw member needs to be prevented from being separated from the female screw member, and an output rod needs to be prevented from dropping off from a housing. Thus, it is necessary to provide a stopper to limit the protrusion and retraction of the output rod at certain positions. However, when the stopper is provided, there is a problem that a size of the actuator increases.

SUMMARY OF THE INVENTION

The present invention is made in view of foregoing circumstances, and provides a telescopic actuator having an output rod which is reliably prevented from being dropped off from a housing without increasing a size of the telescopic actuator.

According to an aspect of the invention, a telescopic actuator includes a housing, an output rod which is slidable in an axial direction with respect to the housing, at least two slide bearings via which the output rod is supported by the housing, and a stopper disposed between the two slide bearings. The stopper regulates a moving end position of the output rod.

Other aspects and advantages of the invention will be apparent from the following description, the drawings and the claims.

DETAILED DESCRIPTION

Hereinafter, embodiments of the invention will be explained with reference to the drawings. The following exemplary embodiments do not limit the scope of the invention.

Figure 1:
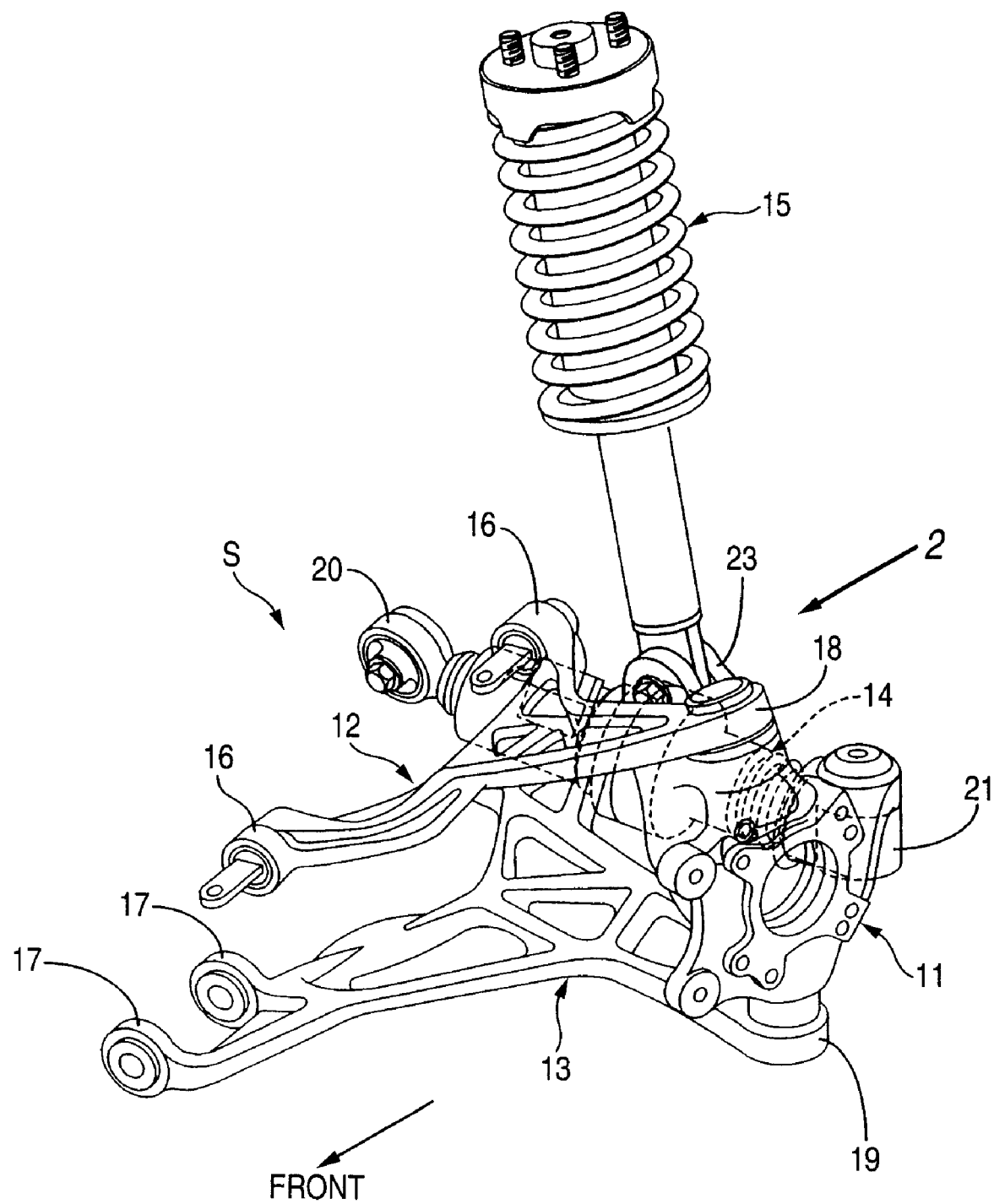
FIG. 1 is a perspective view of a suspension apparatus for a left rear wheel.
Figure 2:
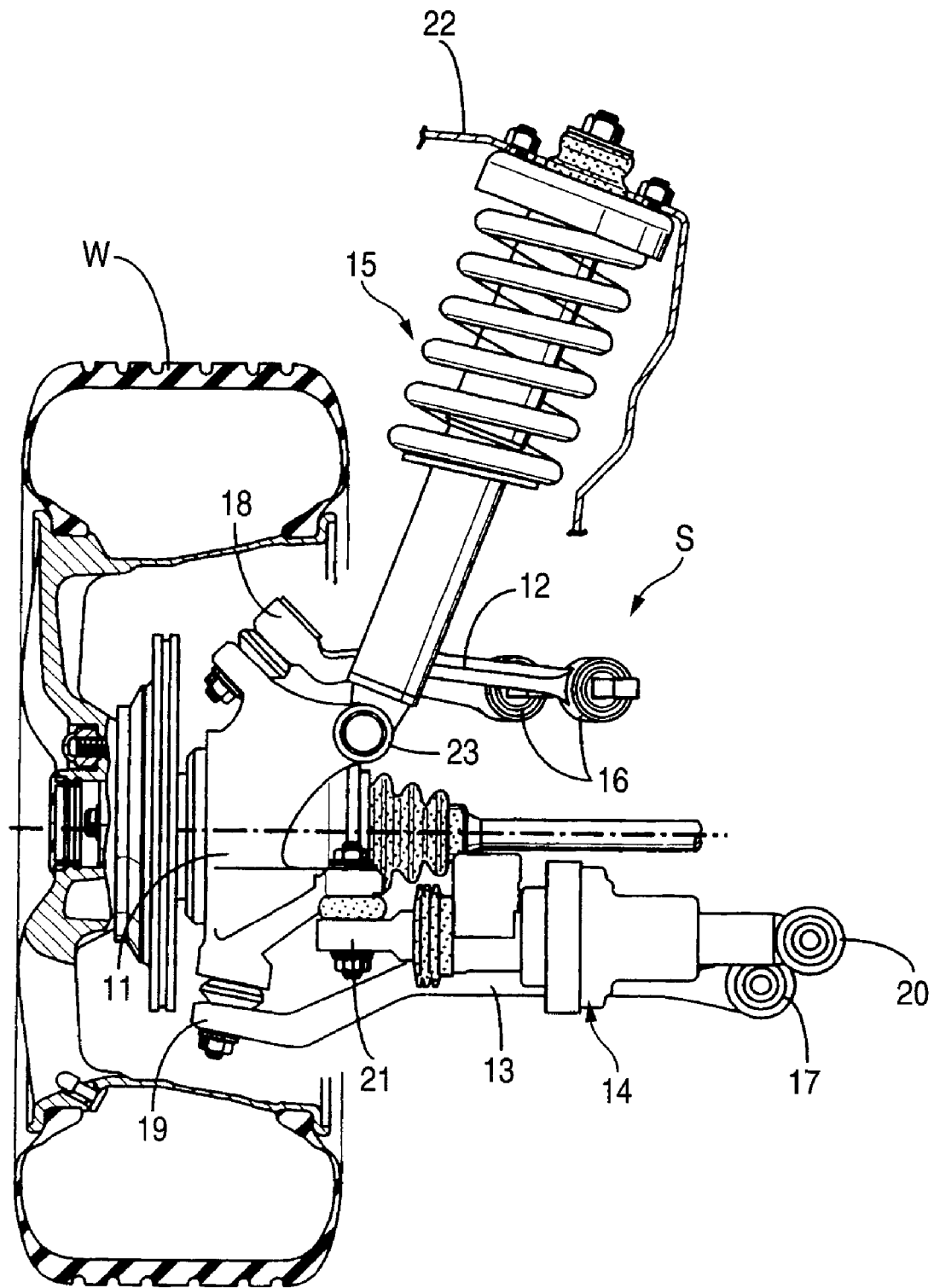
FIG. 2 is a view of the suspension apparatus when seen in a direction 2 shown in FIG. 1.

As shown in FIGS. 1 and 2, a double wishbone type rear suspension S for use in a four wheel steering system vehicle includes a knuckle 11 rotatably supporting a rear wheel W (a wheel), an upper arm 12 and a lower arm 13 respectively coupling the knuckle 11 to a vehicle body such that the knuckle 11 is movable in a vertical direction, a toe control actuator 14 (a telescopic actuator) coupling the knuckle 11 and the vehicle body to control a toe angle of the rear wheel W, a damper 15 with a suspension spring for damping the vertical movement of the rear wheel W.

Each of the upper arm 12 and the lower arms 13 has a base end coupled to the vehicle body via a rubber bush joint 16, 17 and a leading end coupled to an upper portion or a lower portion of the knuckle 11 via ball joints 18, 19. The toe control actuator 14 has a base end coupled to the vehicle body via a rubber bush joint 20 and a leading end coupled to a rear portion of the knuckle 11 via another rubber bush joint 21. The damper 15 has an upper end fixed to the vehicle body, e.g., to an upper wall 22 of a suspension tower, and a lower end coupled to the upper portion of the knuckle 11 via a rubber bush joint 23.

When the toe control actuator 14 is extended, the rear portion of the knuckle 11 is pushed outwardly in a vehicle width direction, whereby the toe angle of the rear wheel W is changed toward a toe-in direction. When the toe control actuator 14 is contracted, the rear portion of the knuckle 11 is pulled inwardly in the vehicle width direction, whereby the toe angle of the rear wheel W is changed toward a toe-out direction. Accordingly, besides a normal front wheel steering by operating a steering wheel, the toe angle of the rear wheel W is controlled in accordance with a vehicle speed and a steering angle of the steering wheel. Thus, straight running stability performance and turning performance of a vehicle can be enhanced.

Next, a structure of the toe control actuator 14 will be described below in detail with reference to FIGS. 3 to 7.

Figure 3:
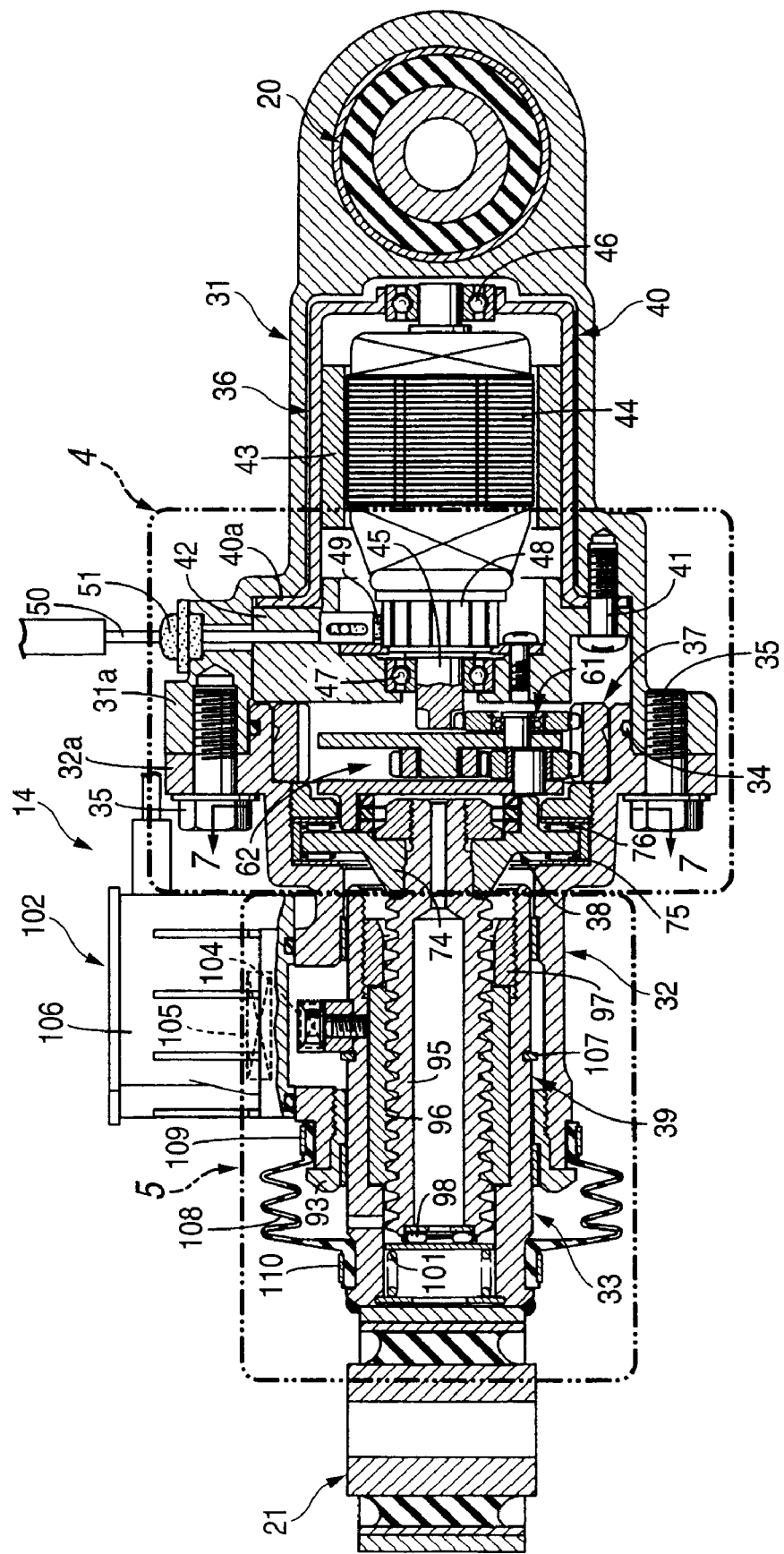
FIG. 3 is a longitudinal section view of a toe control actuator.
Figure 4:
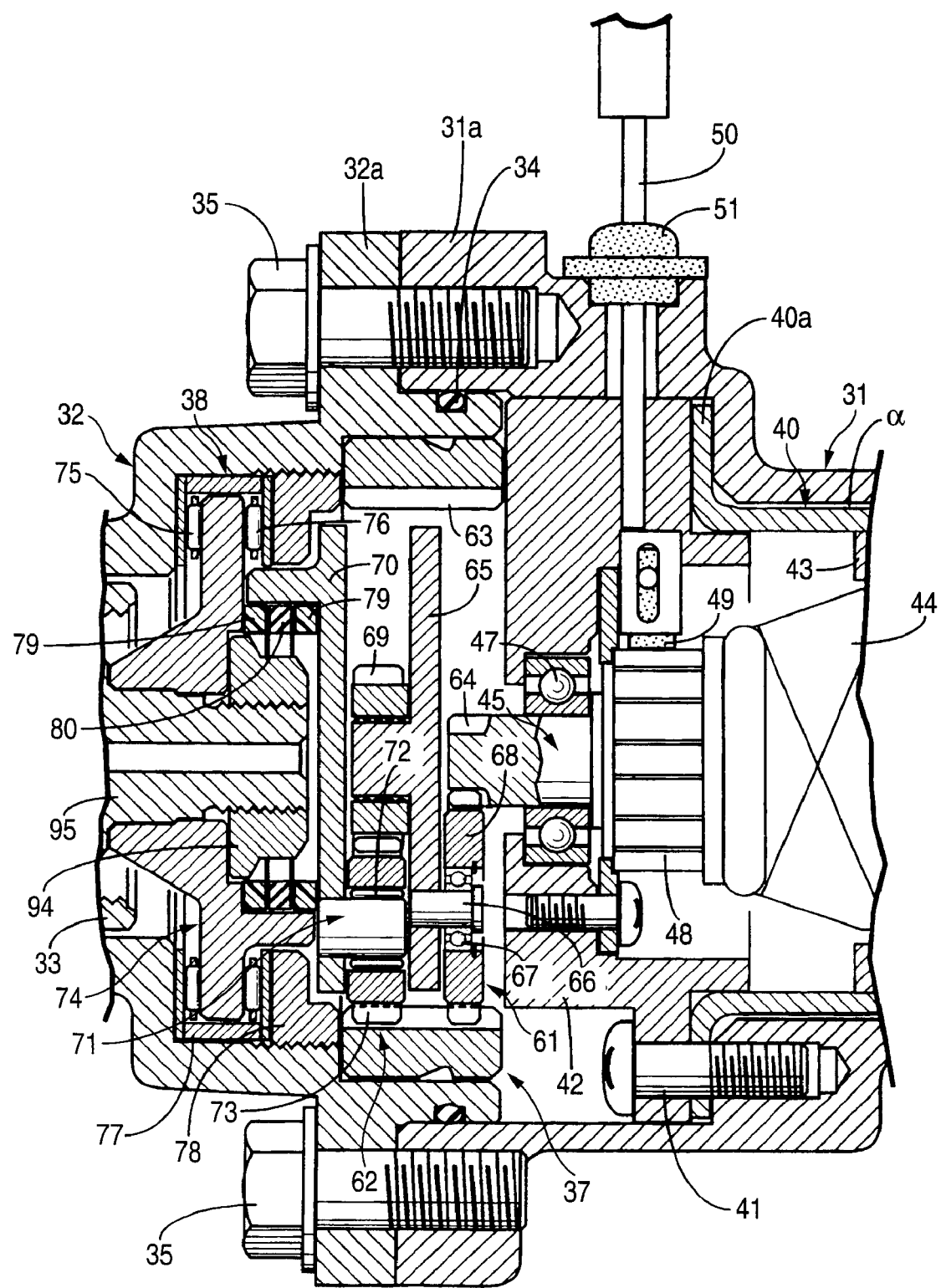
FIG. 4 is an enlarged view of the portion 4 shown in FIG. 3.

As shown in FIGS. 3 and 4, the toe control actuator 14 includes a first housing 31 to which the rubber bush joint 20 to be coupled to the vehicle body is integrally provided, and a second housing 32 (a housing) to which the rubber bush joint 21 to be coupled to the knuckle 11 is provided. The second housing 32 supports an output rod 33 such that the output rod 33 is protrudable and retractible with respect to the second housing 32. The mutually opposing portions of the first and second housings 31, 32 are socket fitted with each other with a seal member 34 interposed therebetween. The respective opposing portions have joining flanges 31a, 32a that are fastened together with bolts 35. A brush-equipped motor 36, which functions as a drive source, is accommodated inside the first housing 31. A planetary gear type reduction gear 37, an elastic coupling 38, and a feed screw mechanism 39 having a trapezoidal screw thread are accommodated inside the second housing 32.

The first housing 31 accommodating the motor 36 and the second housing 32 accommodating the reduction gear 37, the coupling 38 and the feed screw mechanism 39 are respectively assembled beforehand as sub assemblies, and the respective sub assemblies are then joined together as the toe control actuator 14. The first housing 31 and the second housing 32 are joined in a detachable manner. Therefore, the motor 36 may be replaced with a motor having a greater output or a smaller output, or operation characteristic of the reduction gear 37 and/or the feed screw mechanism 39 may be changed simply by replacing the sub assembly of the first housing 31 or the second housing 31 without changing the entire design of the toe control actuator 14. This can enhance versatility with respect to various models and designs, and thus can reduce cost.

A yoke 40 having a shape of a cup and a bearing holder 42 constitutes an outer shape of the motor 36. The yoke 40 has a flange 40a to which the bearing holder 42 is fastened with bolts 41. The bolts 41 are screwed into the first housing 31 on a surface facing the second housing 32, whereby the motor 36 is fixed to the first housing 31.

An annular stator 43 is supported on an inner peripheral surface of the yoke 40. A rotor 44 is disposed on an inner side the stator 43. A rotation shaft of the rotor has one end rotatably supported on a ball bearing 46 which is provided at a bottom portion of the cup-shaped yoke 40, and the other end rotatably supported on another ball bearing 47 provided on the bearing holder 42. A brush 49 is supported on an inner surface of the bearing holder 42. The brush slidingly contacts with a commutator 48 provided on an outer periphery of the rotation shaft 45. A conducting wire 50 extending from the brush 49 is drawn out through a grommet 51 provided on the first housing 31.

The yoke 40, which forms a part of the outer shape of the motor 36, is a rigid member for accommodating the stator 43 and rotor 44 therein. Because this yoke 40 is fixed to the first housing 31, a load input from the rear wheel W to the toe control actuator 14 is received by the first housing 31 so that the load is less likely to be applied to the motor 36. Thus, durability and reliability of the motor 36 can be enhanced. Further, a clearance a (a space) is provided between an outer peripheral surface of the yoke 40 of the motor 36 and an inner peripheral surface of the first housing 31. This clearance a restrains an actuation noise of the motor 36 from leaking out from the first housing 31. Moreover, the clearance a additionally helps to restrain an external force acting on the first housing 31 from being transmitted to the motor 36.

Further, the motor 36 and the first housing 31 are fixed together with the bolts 41 that are used to fasten the yoke 40 of the motor 36 and the bearing holder 42. Therefore, compared with a case in which the motor 36 is fixed to the first housing 31 with bolts other than the bolts 41, the number of bolts can be reduced. Also, a space required for arranging the extra bolts can be saved. Accordingly, it is possible to provide the toe control actuator 14 of a smaller size.

As shown in FIGS. 3 and 4, the reduction gear 37 includes a first planetary gear mechanism 61 and a second planetary gear mechanism 62 that are coupled in to have a two-stage structure, i.e., a tandem arrangement. The first planetary gear mechanism 61 includes a ring gear 63 fixedly fitted into an opening portion of the second housing 32, a first sun gear 64 formed directly on a leading end of the rotation shaft 45 of the motor 36, a first disk-shaped carrier 65, and four first pinions 68. Each of the first pinions 68 is rotatably supported on an associated one of first pinion pins 66 via respective ball bearings 67, and is engaged with both the ring gear 63 and the first sun gear 64. The first pinion pins 66 are press-fitted into the first carrier 65, and are supported by the first carrier 65 in a cantilevered manner. In the first planetary gear mechanism 61, a rotation of the first sun gear 64 (a first input member) is decelerated and transmitted to the first carrier 65 (a first output member).

The second planetary gear mechanism 62 includes the ring gear 63, which is shared with the first planetary gear mechanism 61, a second sun gear 69 fixed to the center of the first carrier 65, a disk-shaped second carrier 70, and four second pinions 73. Each of the second pinions 73 is rotatably supported on an associated one of second pinion pins 71 via respective slide bushes 72, and is engaged with both the ring gear 63 and the second sun gear 69. The second pinion pins 71 are press fitted into the second carrier 70, and are supported by the second carrier 70 in a cantilevered manner. In the second planetary gear mechanism 62, a rotation of the second sun gear 69 (a second input member) is decelerated and transmitted to the second carrier 70 (a second output member).

As described above, the first and second planetary gear mechanisms 61, 62 are coupled together in series. Therefore, a large deceleration ratio (a gear reduction ratio) can be obtained with a smaller size of the reduction gear 37. Also, the sun gear 64 of the first planetary gear mechanism 61 is not fixed to the rotation shaft 45 of the motor 36 but is formed directly on the rotation shaft 45. Thus, compared with a structure in which a first sun gear 64 is provided separately from the rotation shaft 45, the number of parts can be reduced. Further, a diameter of the first sun gear 64 can be minimized so that a large deceleration ratio can be set in the first planetary gear mechanism 61.

The second carrier 70, which is an output member of the reduction gear 37, is coupled to an input flange 74, which is an input member of the feed screw mechanism 39, via the coupling 38. The input flange 74 is formed substantially in a disk shape, and is rotatably supported by a pair of thrust bearings 75, 76 holding an outer peripheral portion of the input flange 74 therebetween. More specifically, a ring-shaped lock nut 78 is fastened into an inner peripheral surface of the second housing 32 such that a spacer collar 77 is sandwiched therebetween. The thrust bearing 75 is arranged so as to support a thrust load between the second housing 32 and input flange 74 while the other thrust bearing 76 is arranged so as to support a thrust load between the lock nut 78 and input flange 74.

Figure 6:
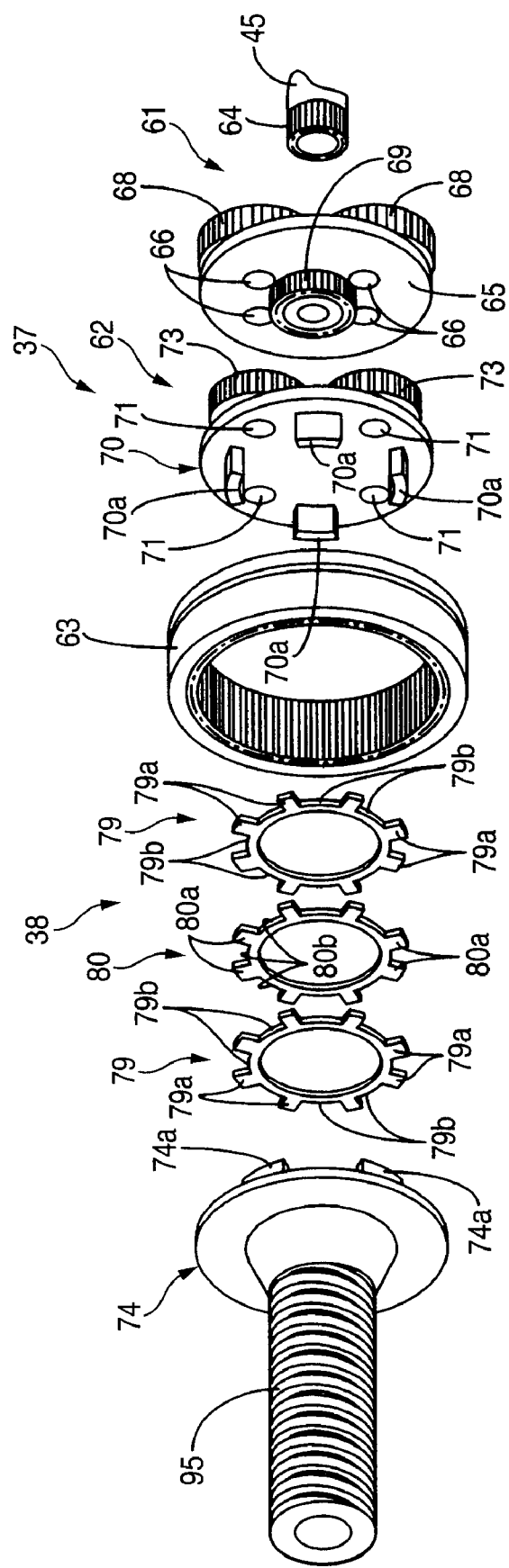
FIG. 6 is an exploded perspective view of a reduction gear and a coupling.
Figure 7:
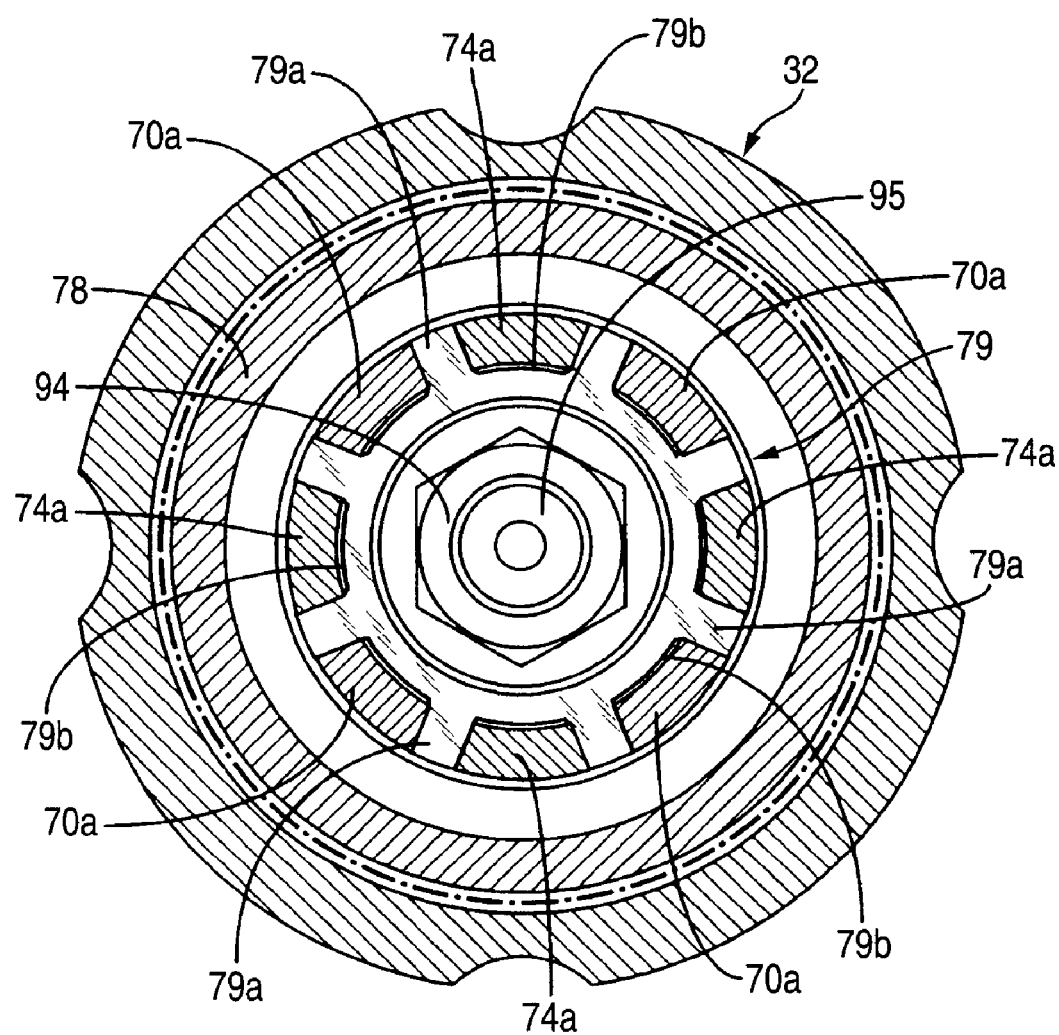
FIG. 7 is an enlarged section view taken along the line 7-7 shown in FIG. 3.

As shown in FIGS. 4, 6 and 7, the coupling 38 includes two outer elastic bushes 79 made of, e.g., polyacetal, and an inner elastic bush 80 made of, e.g., silicone rubber. Each of the outer elastic bushes 79 has eight projections 79a extending radially from an outer circumference thereof. The projections 79a are disposed at regular intervals along a circumferential direction of each of the outer elastic bushes 79 with eight grooves 79b being formed between each of the adjacent projections 79a. Likewise, the inner elastic bush 80 has eight projections 80a extending radially from an outer circumference thereof. The projections 80a are disposed at regular intervals along a circumferential direction of the inner elastic bush 80 with eight grooves 80b being formed between each of the adjacent projections 80a. The second carrier 70 has four pawls 70a formed on a surface facing the input flange 74. The pawls 70a are disposed at regular intervals, each extending in an axial direction. Likewise, the input flange 74 has four pawls 74a formed on a surface facing the second carrier 70. The pawls 74a are disposed at regular intervals, each extending in the axial direction.

The inner elastic bush 80 is sandwiched between the outer elastic bushes 79 such that the projections 79a, 80a are in phase with each other, i.e., axially aligned. The pawls 70a of the second carrier 70 and the pawls 74a of the input flange 74 are alternately engaged with eight groove sections, each of the sections being formed by the grooves 79b, 80b that are axially aligned.

Accordingly, a torque of the second carrier 70 is transmitted from the pawls 70a of the second carrier 70 to the input flange 74 through the projections 79a, 80a of the outer and inner elastic bushes 79, 80 and the pawls 74a of the input flange 74. The outer elastic bushes 79 and the inner elastic bush 80 are both made of elastic material. Thus, the outer elastic bushes 79 and the inner elastic bush 80 absorb a slight axial difference between the second carrier 70 and the input flange 74, and also absorb a sudden change of the torque, thereby enabling a smooth power transmission.

Figure 5:
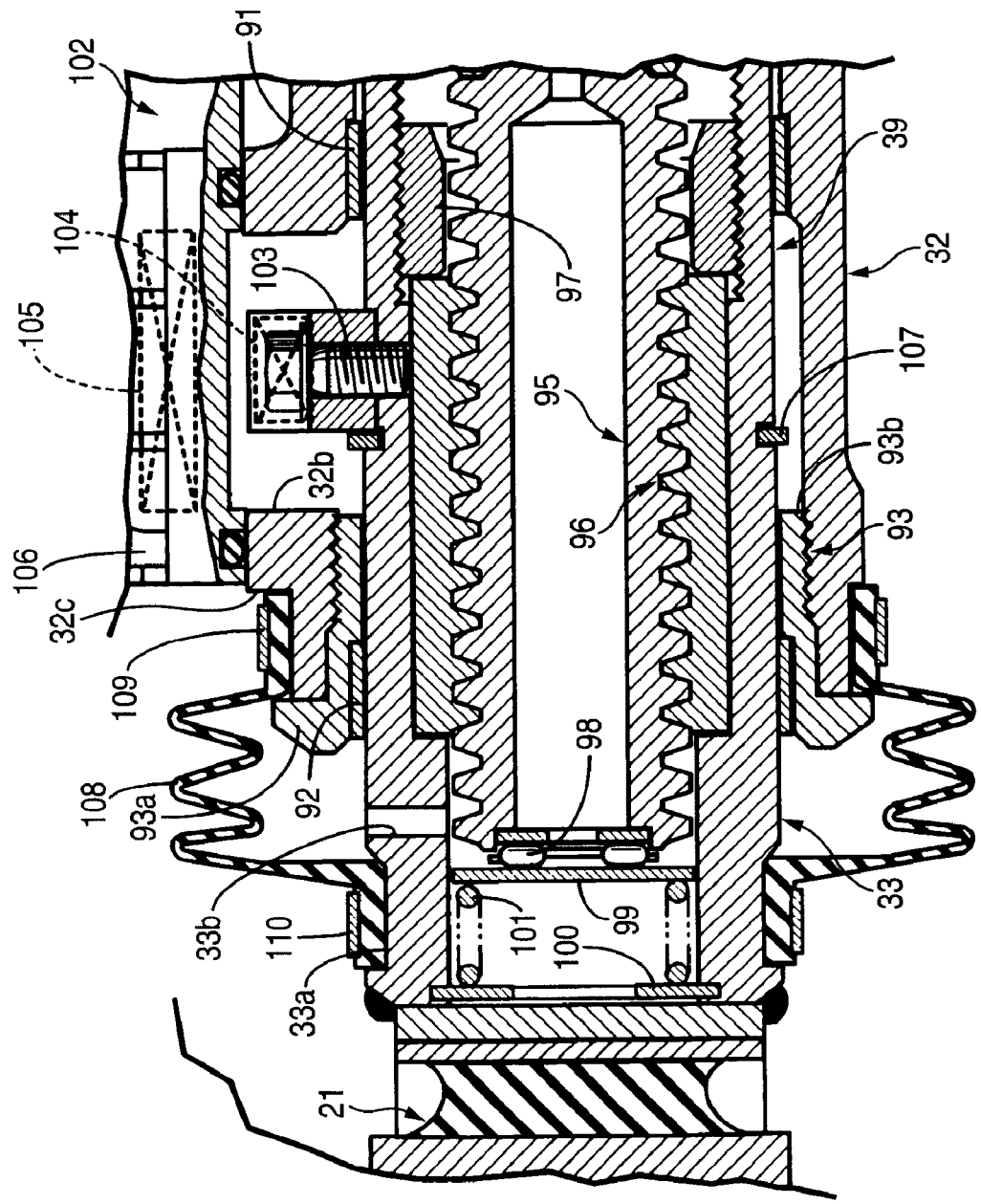
FIG. 5 is an enlarged view of the portion 5 shown in FIG. 3.

As shown in FIG. 5, a first slide bearing 91 is fixed to the inner peripheral surface of the second housing 32 at an intermediate portion of the second housing 32 in the axial direction. A second slide bearing 92 is fixed to an inner peripheral surface of an end member 93 screwed into an end portion of the second housing 32 in the axial direction. The output rod 33 is slidably supported by the first and second slide bearings 91, 92. The feed screw mechanism 39 converts the rotation of the input flange 74 to a thrust movement of the output rod 33. The feed screw mechanism 39 includes a male screw member 95 penetrating through the center of the input flange 74 and fastened with a nut 94 (see FIG. 4), and a female screw member 96 threadedly engaged with an outer peripheral surface of the male screw member 95. The female screw member 96 is fitted inside the inner peripheral surface of the hollow output rod 33, and is fixed thereto by a lock nut 97.

As described above, the output rod 33 is supported inside the second housing 32 by a plurality of slide bearings 91, 92 (two in the embodiment). Therefore, a radial load applied to the output rod 33 can be reliably supported by the second housing 32, thereby preventing the radial load from being applied from the female screw member 96 to the male screw member 95.

A spring base 99 is supported via a thrust bearing 98 at a leading end of the male screw member 95. A coil spring 101 is compressed between the spring base 99 and another spring base 100 provided on a leading end of the output rod 33. The spring force of the coil spring 101 biases the female screw member 96 fixed to the output rod 33 and the male screw member 95 in threaded engagement with the female screw member 96 in opposite directions respectively, thereby eliminating play between threads of the male and female screw members 95, 96.

According to the above configuration, the threads of the male and female screw members 95, 96 are always in close contact with each other so that frictional force is generated. Therefore, in a case where a vibratory load is input to the female screw member 96 from the rear wheel W, or where a large load is input to the female screw member 96 from the rear wheel W, it is possible to prevent the male screw member 95 from rotating spontaneously and thus to prevent the toe angle of the rear wheel W from changing unexpectedly. Thus, control accuracy of the toe angle is improved. As a result, there is no need to apply a current to the motor 36 for the purpose of restraining an unintentional rotation of the male screw member 95, reducing power consumption of the motor 36.

A stroke sensor 102 is provided in the second housing 32. When controlling a telescopic movement of the toe control actuator 14, the stroke sensor 102 detects an axial position of the output rod 33 and feeds back the detected axial position to a control unit. The stroke sensor 102 includes a detectable portion 104 fixed to the outer peripheral surface of the output rod 33 with a bolt 103, and a sensor main body 106 accommodating a detecting portion 105 which detects a position of the detectable portion 104. The detectable portion 104 may be a permanent magnet, and the detecting portion 105 may be a coil which magnetically detects the position of the detectable portion 104. The second housing 32 includes an opening portion 32b which provides a clearance having a certain length in the axial direction. The opening portion 32b allows the output rod 33 and the detectable portion 104 to move without interfering with the second housing 32.

A ring-shaped stopper 107 is provided on the outer peripheral surface of the output rod 33. When the output rod 33 is moved in a protruding direction, the stopper 107 eventually hits a contact surface 93b of the end member 93, whereby the output rod 33 reaches its outermost position. Thus, even when the motor 36 rotates out of control due to some kind of failure, the stopper 107 reliably prevents the output rod 33 from slipping out of the second housing 32. Because the stopper 107 is disposed within a dead space between the first and second slide bearings 91, 92, a space can be saved. The end member 93, on which the second slide bearing 92 is provided, can be separated from the second housing 32. Therefore, the output rod 33 equipped with the stopper 107 can be attached to and detached from the second housing 32 without interfering with the second slide bearing 92.

A boot 108 is provided in order to prevent water and dust from entering a gap between the second housing 32 and output rod 33. The boot 108 has one end portion fitted in a circumferential stepped portion 32c of the second housing 32 and the other end portion fitted in a circumferential groove 33a of the output rod 33. The respective end portions of the boot 108 are then fixed by associated bands 109, 110. A flange 93a of the end member 93 forms a circumferential groove together with the circumferential stepped portion 32c of the second housing 32. Thus, the end portion of the boot 108 fixed by the band 109 can be prevented from slipping off. Because the flange 93a of the end member 93 is utilized to prevent the boot 108 from slipping off, it is not necessary to form a circumferential groove on the second housing 32. Compared with a process of forming a circumferential groove on the second housing 32, a process of forming the circumferential stepped portion 32c is easier. Further, because the circumferential stepped portion 32c requires only one shoulder portion while a circumferential groove requires two shoulder portions, a dimension of the second housing 32 in the axial direction can be reduced by an amount equivalent to a width of one of the two shoulder portions.

When the output rod 33 telescopically moves, inner pressure in the first and second housings 31, 32 changes, and this might obstruct a smooth actuation of the toe control actuator 14. Thus, a hole 33b is formed through the output rod 33 so as to communicate an internal space of the hollow output rod 33 and an internal space of the boot 108. This hole 33b allows the boot 108 to absorb the change of the above-mentioned inner pressure by deforming, thereby enabling the smooth actuation of the toe control actuator 14.

Although a telescopic actuator according to the present invention is used as the toe control actuator 14 in the above-described embodiment, it may be used for other various purposes. When a telescopic actuator according to the present invention is used as the toe control actuator 14, a load to be downwardly applied to the spring of the suspension S can be reduced due to its small size and light weight.

Also, although the feed screw mechanism 39 has the trapezoidal screw thread in the above-described embodiment, other types of screws may also be used, e.g., a ball screw.

While description has been made in connection with embodiments of the present invention, those skilled in the art will understand that various changes and modification may be made therein without departing from the present invention. It is aimed, therefore, to cover in the appended claims all such changes and modifications falling within the true spirit and scope of the present invention.

What is claimed is:

1. A telescopic actuator comprising:
a housing;
an output rod which is slidable in an axial direction with respect to the housing;
at least two slide bearings via which the output rod is supported by the housing;
a sensor to detect a position of the output rod, wherein the sensor includes a detectable portion disposed between the two slide bearings and attached to an outer peripheral surface of the output rod;
a ring-shaped stopper disposed between the two slide bearings and provided on the outer peripheral surface of the output rod such that the ring-shaped stopper is closer to an end portion of the housing than from the sensor, wherein the ring-shaped stopper moves in the axial direction together with the output rod and regulates a moving end position of the output rod; and
an end member detachably attached to an end portion of the housing, wherein the end member comprises a contact surface, and the ring-shaped stopper regulates the moving end of the output rod by contacting the contact surface,
wherein one of the two slide bearings that is closer to the end portion of the housing than from the other is supported by the end member.

2. The telescopic actuator according to claim 1, further comprising a boot comprising one end portion fixed to the output rod and the other end portion fixed to the housing, wherein the end member is configured to prevent the other end portion of the boot from slipping off from the housing.

3. The telescopic actuator according to claim 2, wherein the output rod is formed with a hole communicating an internal space of the output rod and an internal space of the boot.

4. The telescopic actuator according to claim 2, wherein the boot covers a boundary portion between the output rod and the housing, wherein the output rod protrudes out of the housing from the boundary portion.

5. The telescopic actuator according to claim 2, further comprising a first band bound around the one end portion of the boot to fix the one end portion to the output rod, and a second band bound around the other end portion of the boot to fix the other end portion of the boot to the housing.

6. The telescopic actuator according to claim 2, wherein the output rod is formed with a circumferential groove around an outer peripheral surface thereof, the housing comprises a circumferential stepped portion around an outer peripheral surface thereof, the end member comprises a flange around an outer peripheral surface thereof, the one end portion of the boot is fitted in the circumferential groove of the output rod, and the other end portion of the boot is fitted between the circumferential stepped portion of the housing and the flange of the end member.

7. The telescopic actuator according to claim 1, further comprising a feed screw mechanism operable to protrude or to retract the output rod with respect to the housing.

8. The telescopic actuator according to claim 7, wherein the feed screw mechanism comprises a male screw member and a female screw member into which the male screw member is screwed.

9. The telescopic actuator according to claim 8, wherein the female screw member is fixedly fitted to an inner peripheral surface of the output rod.

10. The telescopic actuator according to claim 1, wherein the housing is formed with an opening portion providing a clearance having a certain length in the axial direction between the two slide bearings, and the ring-shaped stopper is movable in the axial direction within the clearance.

11. The telescopic actuator according to claim 1, wherein a part of the end member is fitted on an inner peripheral surface of the housing between the housing and the output rod.

12. The telescopic actuator according to claim 1, wherein the detectable portion is fixed to the outer peripheral surface of the output rod such that the detectable portion moves with the output rod within an opening defined in the housing such that the detectable portion does not interfere with the housing.

* * * * *